United States Patent
Goto

(10) Patent No.: US 12,394,775 B2
(45) Date of Patent: Aug. 19, 2025

(54) PRODUCING METHOD FOR RECTANGULAR BATTERY AND EXAMINING METHOD FOR RECTANGULAR BATTERY

(71) Applicant: Prime Planet Energy & Solutions, Inc., Tokyo (JP)

(72) Inventor: Satoshi Goto, Nagakute (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 508 days.

(21) Appl. No.: 18/145,856

(22) Filed: Dec. 23, 2022

(65) Prior Publication Data
US 2023/0261170 A1 Aug. 17, 2023

(30) Foreign Application Priority Data
Feb. 11, 2022 (JP) ................. 2022-020004

(51) Int. Cl.
H01M 10/48 (2006.01)
H01M 4/04 (2006.01)
H01M 10/04 (2006.01)

(52) U.S. Cl.
CPC ..... H01M 4/0416 (2013.01); H01M 10/0468 (2013.01); H01M 10/48 (2013.01)

(58) Field of Classification Search
CPC ........... H01M 4/0416; H01M 10/0468; H01M 10/48; H01M 10/484; H01M 10/04; H01M 10/0431; H01M 10/0587; Y02P 70/50; Y10T 29/49108; H01G 9/15; C08L 23/0846
See application file for complete search history.

(56) References Cited

U.S. PATENT DOCUMENTS

| | | | | |
|---|---|---|---|---|
| 6,343,005 B1 * | 1/2002 | Tadanobu | ................ | H01G 9/15 361/510 |
| 9,879,123 B2 * | 1/2018 | Sano | ................... | C08L 23/0846 |
| 10,347,946 B2 * | 7/2019 | Tamaki | ............... | H01M 50/423 |
| 2017/0358829 A1 * | 12/2017 | Inoue | .................. | H01M 50/578 |

FOREIGN PATENT DOCUMENTS

JP 2015197968 A 11/2015

* cited by examiner

*Primary Examiner* — Donghai D Nguyen
(74) *Attorney, Agent, or Firm* — HAUPTMAN HAM, LLP

(57) ABSTRACT

A producing method and an examining method for a rectangular battery in which an impregnated state of an electrolytic solution impregnated in an electrode body are appropriately examined are provided. A producing method for the rectangular battery includes a step of impregnation examining to determining an impregnated state of the electrolytic solution in the electrode body by holding and pressing a first side wall portion and a second side wall portion of the rectangular battery to bring their inside surfaces into contact with an electrode body, bringing a transmitting probe and a receiving probe into close contact with the first side wall portion and the second side wall portion respectively, and in a state that an absorption member is placed to absorb diffused ultrasonic wave or going-around ultrasonic wave, transmitting the post-penetrated ultrasonic wave to pass through the electrode body and others, and receiving it by the receiving probe.

2 Claims, 11 Drawing Sheets

PRODUCING METHOD FOR RECTANGULAR BATTERY AND EXAMINING METHOD FOR RECTANGULAR BATTERY

CROSS-REFERENCE TO RELATED APPLICATIONS

This application is based upon and claims the benefit of priority from the prior Japanese Patent Application No. 2022-020004, filed Feb. 11, 2022, the entire contents of which are incorporated herein by reference.

BACKGROUND

Technical Field

The present disclosure relates to a producing method for a rectangular battery in which an electrode body and electrolytic solution are housed in a rectangular battery case and an examining method for a rectangular battery.

Related Art

Heretofore, in a producing process of a battery, there is a case that an impregnated state of electrolytic solution impregnated in an electrode body is examined after assembling a battery and injecting the electrolytic solution in a battery case but before initial charging of the battery. For example, JP2015-197968A has disclosed an impregnation examination device and an impregnation examination method of examining an impregnated state of electrolytic solution in an electrode body by use of ultrasonic wave. Specifically, in the impregnation examination method of this JP2015-197968A, an ultrasonic wave output section and an ultrasonic wave receipt section are placed to oppose each other with a battery sandwiched therebetween so that ultrasonic wave output from the ultrasonic wave output section toward the battery is received by the ultrasonic wave receipt section. Then, the impregnated state of the electrolytic solution into the electrode body is determined according to an attenuation ratio of the received ultrasonic wave relative to the output ultrasonic wave.

SUMMARY

Technical Problems

However, in the impregnation examination method of JP2015-197968A, there are spaces between the ultrasonic wave output section and the battery and between the ultrasonic wave receipt section and the battery, and thus some batteries (especially, a battery having a thick thickness) cannot be appropriately determined the impregnated state of the electrolytic solution into the electrode body.

On the other hand, when the ultrasonic wave output section and the ultrasonic wave receipt section are each brought into close contact with the battery case in order to avoid the above-mentioned problem, it has been confirmed that the impregnated state of the electrolytic solution cannot be appropriately determined since the ultrasonic wave output from the ultrasonic wave output section takes a roundabout path to propagate in the rectangular battery case and is received by the ultrasonic wave receipt section.

The present inventors have further studied and confirmed that the impregnated state of the electrolytic solution cannot be appropriately determined when a layer of air exists between the rectangular battery case and the electrode body inside the battery.

The present disclosure has been made in view of the above circumstances and has a purpose of providing a producing method for a rectangular battery which can be appropriately examined an impregnated state of electrolytic solution into an electrode body and an examining method for the rectangular battery.

Means of Solving the Problems

One aspect of the present disclosure to solve the above problem is a producing method FOR a rectangular battery in which an electrode body and electrolytic solution are housed in a rectangular battery case, wherein the method includes impregnation examining performed by: holding and pressing a first side wall portion and a second side wall portion opposing each other with the electrode body sandwiched therebetween in the rectangular battery case of the rectangular battery that has been assembled and bringing an inside surface of the first side wall portion and an inside surface of the second side wall portion to be in respectively contact with the electrode body; bringing a transmitting probe into close contact with a first measured portion in an outside surface of the first side wall portion and bringing a receiving probe into close contact with a second measured portion in an outside surface of the second wall portion; in a state in which an absorption member is placed in a peripheral portion of at least any one of the first measured portion and the second measured portion, the absorption member absorbing at least any one of diffused ultrasonic wave to be spread and propagated to a periphery from the first measured portion and going-around ultrasonic wave to be propagated from a periphery of the second measured portion to the second measured portion, receiving post-penetrated ultrasonic wave which has been sent out from the transmitting probe and penetrated through the first side wall portion and the electrode body to reach the second side wall portion, and determining an impregnated state of the electrolytic solution into the electrode body based on a received signal obtained from the receiving probe.

According to the above-mentioned producing method for the rectangular battery, in the process of impregnation examining, the first side wall portion and the second side wall portion of the rectangular battery case are held and pressed therebetween so that the inside surface of the first side wall portion and the inside surface of the second side wall portion are brought into contact with the electrode body and that the transmitting probe and the receiving probe are brought into close contact with the first measured portion in the outside surface of the first side wall portion and with the second measured portion in the outside surface of the second side wall portion, respectively. Therefore, the transmitted ultrasonic wave sent out from the transmitting probe is directly transmitted to the first side wall portion, reaches the electrode body without passing through the air layer, penetrates through the electrode body, is further conveyed from the electrode body to the second side wall portion without passing through the air layer, and then is directly transmitted to the receiving probe from the second side wall portion. Thus, the post-penetrated ultrasonic wave that has been sent out from the transmitting probe and penetrated through the electrode body and others can be appropriately received by the receiving probe.

Further, at least any one of peripheral portions of the first measured portion to which the transmitting probe is closely contacted and the second measured portion to which the receiving probe is closely contacted in the rectangular battery case is provided with the absorption material absorbing the diffused ultrasonic wave or the going-around ultrasonic wave. Thereby, a part of the transmitted ultrasonic wave sent from the transmitting probe does not penetrate the electrode body but is diffused from the first measured portion to go around the rectangular battery case for propagation and to reach the second measured portion to be received by the receiving probe, thereby preventing the ultrasonic wave from turning to noise.

As mentioned above, the impregnated state of the electrolytic solution into the electrode body can be appropriately examined.

To be specific, when the electrolytic solution is well impregnated into the electrode body, after a certain elapsed time has passed since transmission of transmitted ultrasonic wave of a burst waveform from the transmitting probe has started, post-penetrated ultrasonic wave of the burst waveform having a similar frequency with the transmitted ultrasonic wave is received as the received ultrasonic wave. This is because the electrode body that has been impregnated well with the electrolytic solution can be easily penetrated by ultrasonic wave.

However, when the electrolytic solution fails to be impregnated into the electrode body at all, even if the similar transmitted ultrasonic wave is sent from the transmitting probe, the receiving probe can hardly receive the post-penetrated ultrasonic wave as the received ultrasonic wave. This is because the ultrasonic wave cannot easily penetrate through the electrode body including the air layer due to no impregnation of the electrolytic solution.

Further, when the impregnation of the electrolytic solution into the electrode body is not enough, timing of the received ultrasonic wave formed of the transmitted ultrasonic wave received by the receiving probe may be deviated from the above-mentioned elapsed time, or an amplitude of the receipt ultrasonic wave becomes smaller than that in a case of the electrolytic solution being impregnated well enough into the electrode body.

Accordingly, in a producing process of the battery, the impregnated state for the electrolytic solution into the electrode body can be appropriately examined based on the received signal corresponding to the received ultrasonic wave by the post-penetrated ultrasonic wave.

As an "electrode body" to be housed in a rectangular battery, for example, there are given a laminate-type electrode body in which a plurality of rectangular electrode plates are laminated with separators interposed therebetween and a flat-wound electrode body in which strip-shaped electrode plates are flat wound with strip-shaped separators interposed therebetween. Further, the rectangular battery may be a battery in which a single electrode body is housed in a rectangular battery case or a battery in which a plurality of electrode bodies are stacked in a direction orthogonal to a first side wall portion and a second side wall portion in the rectangular battery case.

As an "absorption material" to absorb ultrasonic wave, for example, there may be given an absorption material made of rubber and an absorption material made of resin, clay, grease, gel, and the like.

Further, another aspect of the present disclosure is an examining method for a rectangular battery in which an electrode body and electrolytic solution are housed in a rectangular battery case, wherein the method includes impregnation examining performed by: holding and pressing a first side wall portion and a second side wall portion opposing each other with the electrode body sandwiched therebetween in the rectangular battery case of the rectangular battery that has been assembled and bringing an inside surface of the first side wall portion and an inside surface of the second side wall portion to be in respectively contact with the electrode body; bringing a transmitting probe into close contact with a first measured portion in an outside surface of the first side wall portion and bringing a receiving probe into close contact with a second measured portion in an outside surface of the second wall portion; in a state in which an absorption member is placed in a peripheral portion of at least any one of the first measured portion and the second measured portion, the absorption member absorbing at least any one of diffused ultrasonic wave to be spread and propagated to a periphery from the first measured portion and going-around ultrasonic wave to be propagated from a periphery of the second measured portion to the second measured portion, receiving post-penetrated ultrasonic wave which has been sent out from the transmitting probe and penetrated through the first side wall portion and the electrode body to reach the second side wall portion, and determining an impregnated state of the electrolytic solution into the electrode body based on a received signal obtained from the receiving probe.

The above-mentioned examining method for the rectangular battery includes the above-mentioned process of impregnation examining, and thus a rectangular battery that has become an object to be examined can be appropriately examined its impregnated state of electrolytic solution into an electrode body.

DETAILED DESCRIPTION OF THE EXEMPLARY EMBODIMENTS

Embodiment 1

Figure 1:
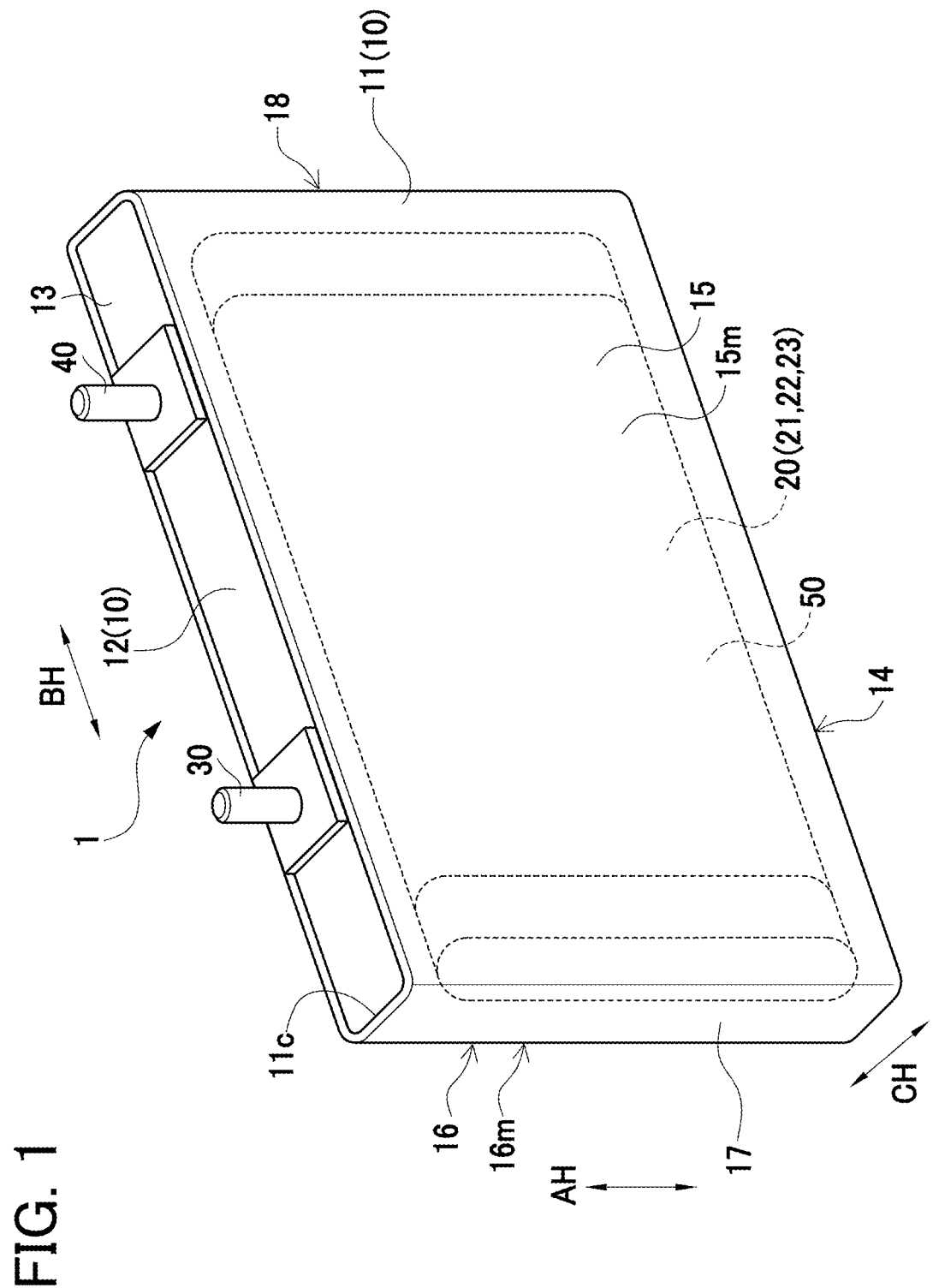
FIG. 1 is a perspective view of a rectangular battery in embodiments 1 and 2.

A first embodiment of the present disclosure is explained in detail below with reference to the accompanying drawings. FIG. 1 is a perspective view of a rectangular battery of an almost parallelepiped shape (hereinafter, simply also referred as a "battery") 1. Herein, in the following explanation, a vertical direction AH, a lateral direction BH, and a thickness direction CH of the battery 1 are defined as directions indicated in FIG. 1. This battery 1 is a rectangular hermetically-closed lithium-ion secondary battery mounted on a hybrid car, a plug-in hybrid car, electric automobile, and others.

The battery 1 is configured with a rectangular battery case (hereinafter, simply referred as a "battery case") 10, an electrode body 20 housed inside this battery case 10, a positive electrode terminal 30 and a negative electrode terminal 40 which are supported by the battery case 10, and others. Further, in the battery case 10, electrolytic solution 50 is housed, and a part of the solution 50 is impregnated in the electrode body 20 and the other part of the solution 50 resides in a bottom portion of the battery case 10.

In these elements, the rectangular battery case 10 is of a parallelepiped box-like shape made of metal (in the present embodiment 1, aluminum) and includes an upper wall portion 13, a lower wall portion 14 opposing the upper wall portion 13, and four side wall portions (a first side wall portion 15 and a second side wall portion each having a wide area and opposing each other with the electrode body 20 interposed therebetween, and a third side wall portion 17 and a fourth side wall portion 18 each having a narrower area than the first and second side wall portions 15 and 16). This battery case 10 is configured with a case body member 11 of a bottomed rectangular cylindrical shape having an opening 11c, and a case lid member 12 of a rectangular plate-like shape which is welded to close the opening 11c of the case body member 11. The case lid member 12 is provided with a safety valve (not shown) which is to be broken when an inner pressure of the battery case 10 has reached a predetermined pressure. Further, the case lid member 12 is formed with an injection hole (not shown) to communicate inside and outside the battery case 10 and is hermetically closed by a closing member (not shown).

Further, the case lid member 12 is fixedly provided with the positive electrode terminal 30 which is configured with a plurality of aluminum components in an insulated state from the case lid member 12. This positive electrode terminal 30 is connected and electrically continued with a positive electrode plate 21 of the electrode body 20 inside the battery case 10 and also penetrates the case lid member 12 to extend outside the battery. Further, the case lid member 12 is fixedly provided with the negative electrode terminal 40 configured with a plurality of copper elements in an insulated state from the case lid member 12. This negative electrode terminal 40 is connected and electrically continued with a negative electrode plate 22 of the electrode body 20 inside the battery case 10 and also penetrates the case lid member 12 to extend outside the battery.

The electrode body 20 is a flat-wound electrode body formed in a manner that a strip-shaped positive electrode plate 21 and a strip-shaped negative electrode plate 22 are laminated via a pair of strip-shaped separators 23 formed of resin-made porous film. This electrode body 20 is placed sideways and housed in the battery case 10.

Figure 2:
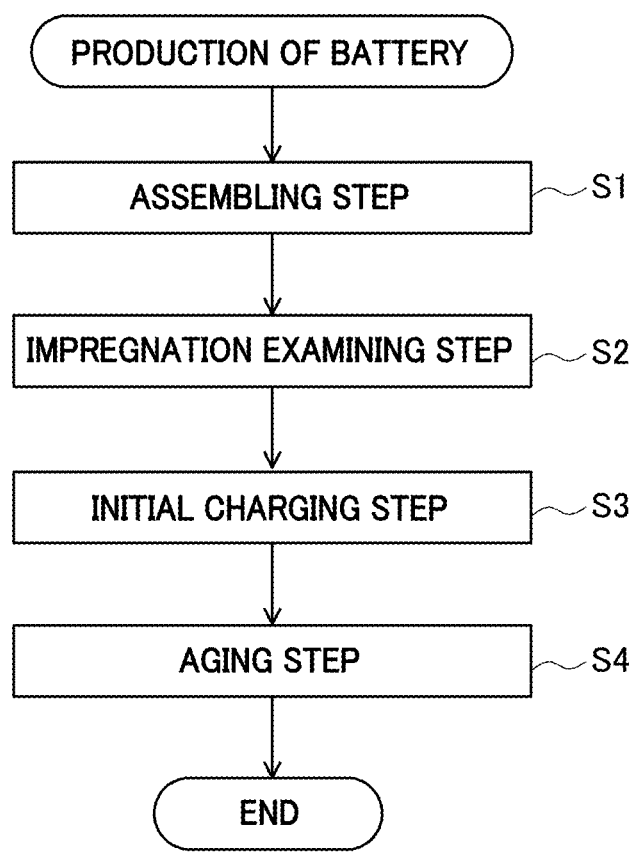
FIG. 2 is a flowchart indicating a producing process of the rectangular battery in the embodiment 1.

Next, a producing method of the above-mentioned rectangular battery 1 is explained (see FIG. 2). Firstly, in an "assembling step" S1, the battery 1 is assembled. Specifically, the case lid member 12 is prepared and the positive electrode terminal 30 and the negative electrode terminal 40 are fixedly set in this case lid member 12 (see FIG. 1). Subsequently, the positive electrode terminal 30 and the negative electrode terminal 40 which are fixedly set in the case lid member 12 are welded to the positive electrode plate 21 and the negative electrode plate 22 of the electrode body 20 which are formed separately, respectively. The case body member 11 is then prepared. The electrode body 20 is inserted in the case body member 11, and the opening 11c of the case body member 11 is closed by the case lid member 12. After that, the case body member 11 and the case lid member 12 are welded over an entire circumference of the case lid member 12 to form the battery case 10. Then, the electrolytic solution 50 is injected in the battery case 10 through an injection hole (not shown) of the case lid member 12, and thereafter this injection hole is hermetically closed by a closing member (not shown).

Figure 3:
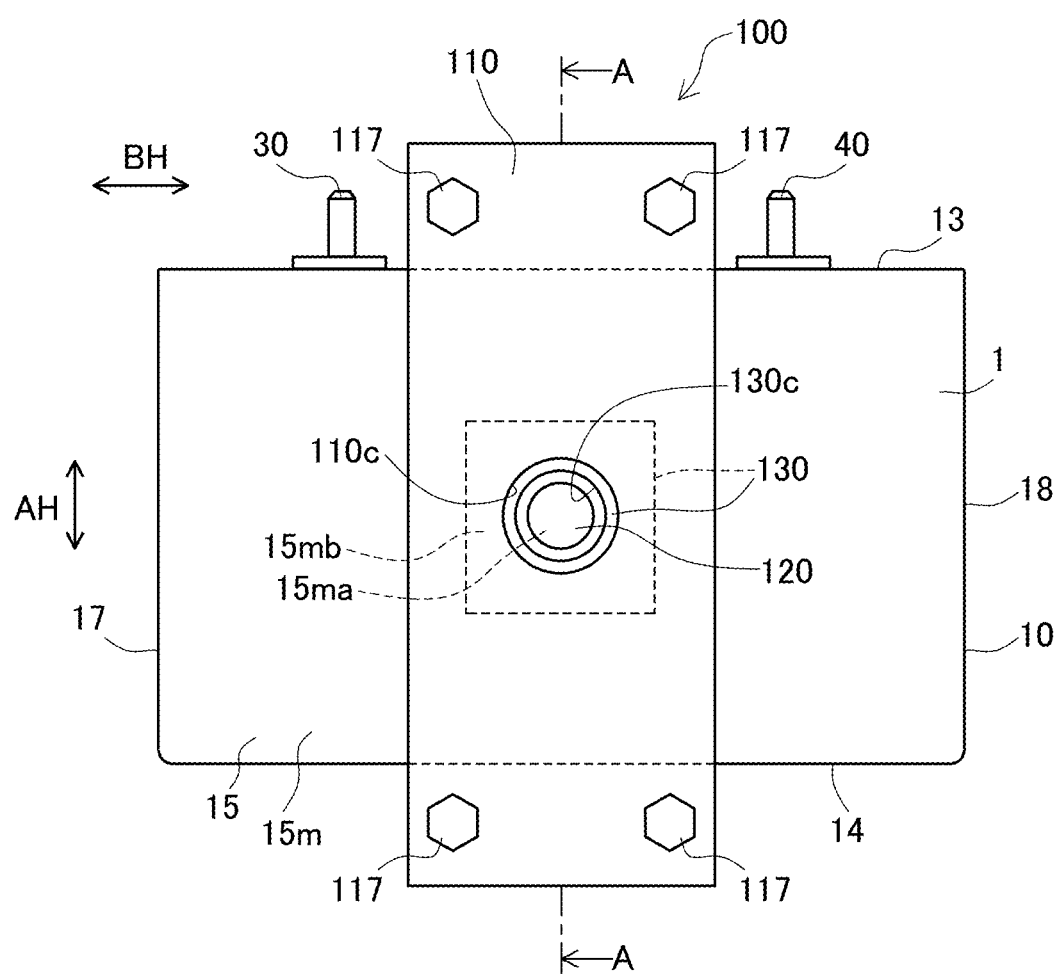
FIG. 3 is a side view of an impregnation examination device and the rectangular battery disposed in the device when seen in a thickness direction of the rectangular battery in the embodiments 1 and 2.
Figure 4:
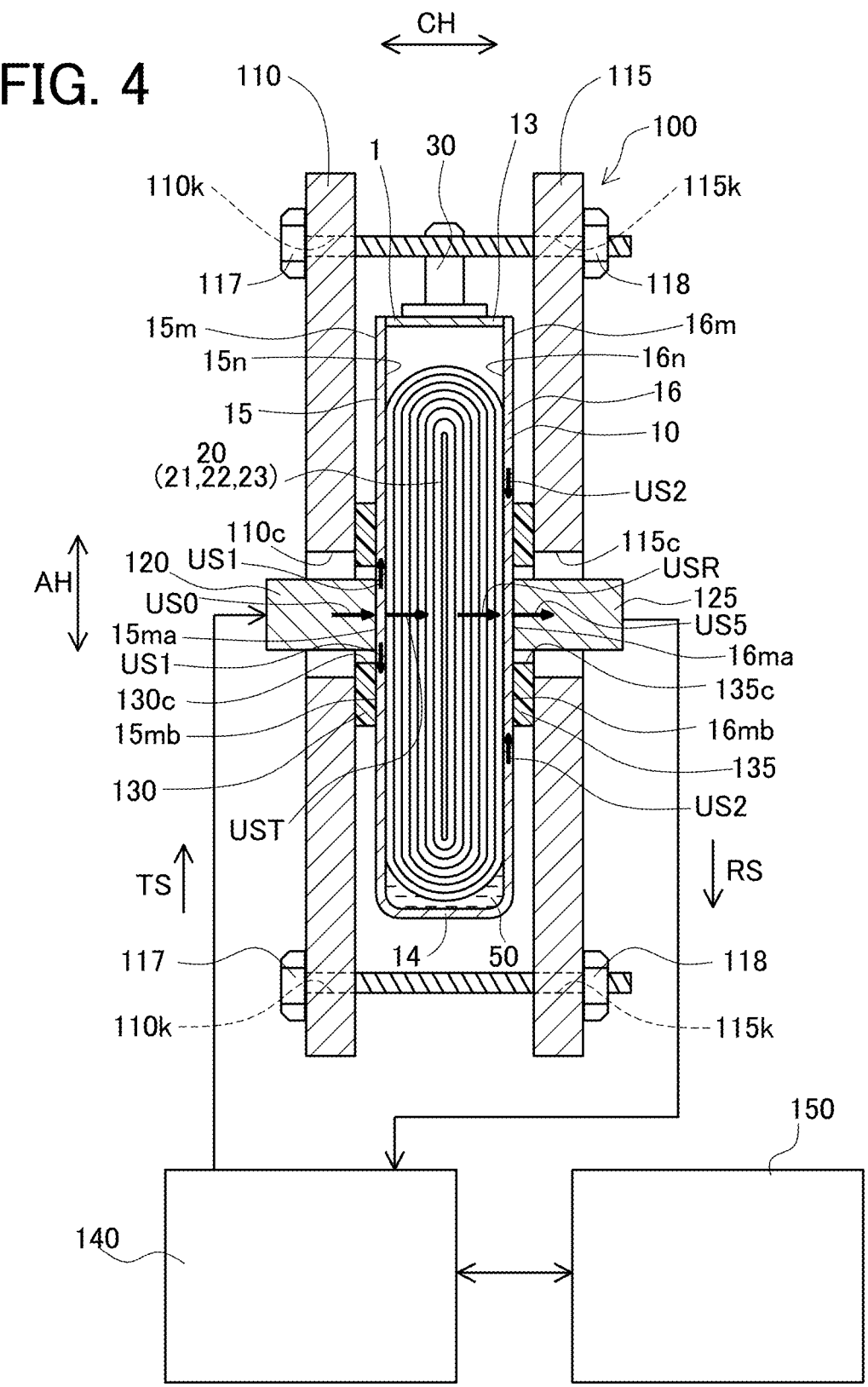
FIG. 4 is a sectional view of the impregnation examination device and the rectangular battery disposed in the device in the embodiments 1 and 2 taken along a line A-A in FIG. 3.

Subsequently, in an "impregnation examining step" S2, the battery 1 assembled in the assembling step S1 is examined an impregnated state of the electrolytic solution 50 into the electrode body 20. In the present embodiment 1, this impregnation examining step S2 is carried out after three hours has passed since injection of the electrolytic solution 50 has been completed in the assembling step S1. An impregnation examination device 100 used for the impregnation examining step S2 is now explained (see FIG. 3 and FIG. 4). This impregnation examination device 100 is provided with a pair of binding plates 111 and 115 pressing and binding the battery 1 in the thickness direction CH, a transmitting probe 120 sending transmitted ultrasonic wave US0 by transmission signal TS, a receiving probe 125 receiving received ultrasonic wave US5 and outputting receipt signal RS, an absorption member 130 absorbing diffused ultrasonic wave US1, an absorption member 135 absorbing go-around ultrasonic wave US2, a probe drive unit 140 transmitting the transmission signal TS to the transmitting probe 120 and receiving the receipt signal RS from the receiving probe 125, and a controller 150 performing control of the probe drive unit 140 and others.

Among those elements, the binding plates 110 and 115 are each of a rectangular plate-like shape and made of metal (in the present embodiment 1, aluminum). The binding plates 110 and 115 are formed in their center with openings 110c and 115c, respectively to place the transmitting probe 120 or the receiving probe 125. Further, neighbors of four corner portions of the binding plates 110 and 115 are formed with through holes 110k and 115k through which bolts 117 are inserted. The battery 1 is held by the pair of binding plates 110 and 115 in the thickness direction, and the bolts 117 are inserted in the through holes 110k and 115k of the binding plates 110 and 115, respectively, to be screwed with nuts 118 so that the battery 1 is held and pressed in the thickness direction CH. Thus, the first side wall portion 15 and the second side wall portion 16 of the battery case 10 of the battery 1 are held and pressed by the binding plates 110 and 115 with the absorption members 130 and 135 interposed therebetween so that an inside surface 15n of the first side wall portion 15 and an inside surface 16n of the second side wall portion 16 of the battery case 10 are brought into contact with the electrode body 20.

The transmitting probe 120 is configured to send the transmitted ultrasonic wave US0 by the transmission signal TS. This transmitting probe 120 is placed in the opening 110c of one binding plate 110 with a clearance and in an opening 130c of the absorption member 130 explained later with a clearance while the transmitting probe 120 is in close contact with a first measured portion 15ma in a center of an outside surface 15m of the first side wall portion 15 of the battery case 10. According to this configuration, the transmitted ultrasonic wave US0 can be directly transmitted to the first measured portion 15ma of the first side wall portion 15 from the transmitting probe 120.

On the other hand, the receiving probe 125 is configured to output the received ultrasonic wave US5 as the receipt signal RS. This receiving probe 125 is placed in the opening 115c of the other binding plate 115 with a clearance and in the opening 135c of the absorption member 135 explained later with a clearance while the receiving probe 125 is in close contact with a second measured portion 16ma in a center of the outside surface 16m of the second side wall portion 16 of the battery case 10. Thus, the received ultrasonic wave US5 that has reached the second measured portion 16ma of the second side wall portion 16 from every part can be directly received by the receiving probe 125 to generate the receipt signal RS.

The absorption members 130 and 135 are each of a rectangular plate-like shape and made of natural rubber. The absorption members 130 and 135 are formed in their center with the openings 130c and 135c, respectively, to be set with the transmitting probe 120 or the receiving probe 125. One absorption member 130 is held between the binding plate 110 and the first side wall portion 15 of the battery case 10 and is in close contact with a peripheral portion 15mb surrounding the first measured portion 15ma of the first side wall portion 15. Thus, of the transmitted ultrasonic wave US0 that has been sent to the first measured portion 15ma from the transmitting probe 120, the diffused ultrasonic wave US1 (indicated with an upward arrow and a downward arrow in FIG. 4), which is propagated to the first side wall portion 15 to expand around the first measured portion 15ma, is absorbed by this absorption member 130 so that the diffused ultrasonic wave US1 is prevented from expanding over the first side wall portion 15 for further propagation. Further, the other absorption member 135 is held between the binding plate 115 and the second side wall portion 16 of the battery case 10 and is in close contact with a peripheral portion 16mb surrounding the second measured portion 16ma of the second side wall portion 16. Thus, the going-around ultrasonic wave US2 (indicated with a downward arrow and an upward arrow in FIG. 4), which is propagated to the second side wall portion 16 toward the second measured portion 16ma from the periphery of the second measured portion 16ma of the second side wall portion 16, can be absorbed by this absorption member 135 to prevent the going-around ultrasonic wave US2 from reaching the second measured portion 16ma.

The probe drive device 140 is Ultrasonic Pulser & Receiver JPR-600 made by JAPAN PROBE CO., LTD. in the present embodiment 1. This probe drive device 140 is connected with the transmitting probe 120 and the receiving probe 125 and is configured to generate the transmission signal TS to transmit the transmitted ultrasonic wave US0 from the transmitting probe 120 and to receive the receipt signal RS generated in the receiving probe 125 corresponding to the received ultrasonic wave US5.

The controller 150 includes a microcomputer including a CPU, an ROM, and an RAM, which are not shown and being operated by a determined control program that has been stored in the ROM and the like. The controller 150 is connected with the probe drive device 140 to control the probe drive device 140. Further, the controller 150 determines an impregnated state of the electrolytic solution 50 into the electrode body 20 based on the receipt signal RS received by the probe drive device 140 as explained later.

Next, an impregnation examining step S2 performed by the above-mentioned impregnation examination device 100 is explained. The battery 1 is firstly set in the impregnation examination device 100. Specifically, the first side wall portion 15 and the second side wall portion 16 of the battery case 10 of the battery 1 are held and pressed by the pair of binding plates 110 and 115 so that the inside surface 15n of the first side wall portion 15 and the inside surface 16n of the second side wall portion 16 are brought into contact with the electrode body 20. At this time, the binding plates 110 and 115 have the absorption members 130 and 135 interposed respectively in each space with the battery 1 so that the absorption member 130 is in close contact with the peripheral portion 15mb around the first measured portion 15ma of the first side wall portion 15 and the absorption member 135 is in close contact with the peripheral portion 16mb around the second measured portion 16ma of the second side wall portion 16. Further, after binding, the transmitting probe 120 is brought into close contact with the first measured portion 15ma of the first side wall portion 15 and the receiving probe 125 is brought into close contact with the second measured portion 16ma of the second side wall portion 16.

Figure 5:
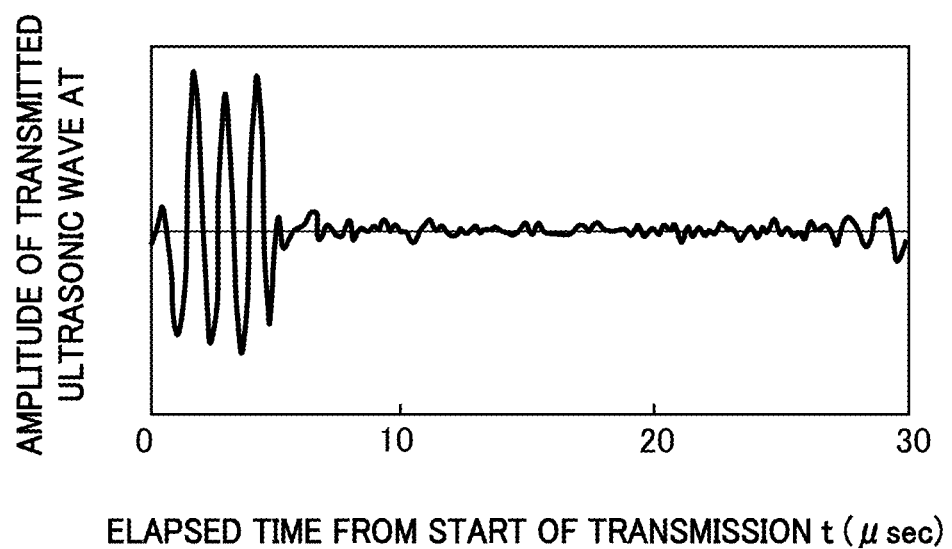
FIG. 5 is a graph showing a relation between an elapsed time from start of sending ultrasonic wave and an amplitude of transmitted ultrasonic wave sent out from a transmitting probe in an embodiment and comparative embodiments 1 and 2.

Then, the transmitted ultrasonic wave US0 is sent from the transmitting probe 120 by the transmission signal TS which is generated in the probe drive device 140. In the present embodiment 1, as shown in FIG. 5, the transmitted ultrasonic wave US0 of a burst waveform at a frequency of 0.8 MHz with three waves included (continuing for about 5 pec) is sent. A most part of the transmitted ultrasonic wave US0 sent out from the transmitting probe 120 advances straight in the thickness direction CH of the battery 1 and is transmitted to the first side wall portion 15 (its first measured portion 15ma) as pre-penetrated ultrasonic wave UST. The ultrasonic wave further advances straight in the thickness direction CH, passes through the electrode body 20, and reaches the second side wall portion 16 (its second measured portion 16ma) as post-penetrated ultrasonic wave USR. Finally, the ultrasonic wave is received by the receiving probe 125 as the received ultrasonic wave US5.

In the present embodiment 1, the transmitting probe 120 is brought into close contact with the first measured portion 15ma of the first side wall portion 15 with no clearance created between the transmitting probe 120 and the first measured portion 15ma, so that the transmitted ultrasonic wave US0 is easily transmitted to the first measured portion 15ma from the transmitting probe 120. Further, the receiving probe 125 is brought into close contact with the second measured portion 16ma of the second side wall portion 16 with no clearance created between the second measured portion 16ma and the receiving probe 125, so that the received ultrasonic wave US5 is easily conveyed to the receiving probe 125 from the second measured portion 16ma.

Further, the inside surface 15n of the first side wall portion 15 and the inside surface 16n of the second side wall portion 16 of the battery case 10 are each in contact with the electrode body 20, so that there is no layer of air in each space between the first side wall portion 15 and the electrode body 20 and between the second side wall portion 16 and the electrode body 20. Therefore, the pre-penetrated ultrasonic wave UST sent to the first measured portion 15ma as a part of the transmitted ultrasonic wave US0 is easily transmitted to the electrode body 20 from the first side wall portion 15. Further, the post-penetrated ultrasonic wave USR is easily conveyed to the second side wall portion 16 from the electrode body 20.

On the other hand, the diffused ultrasonic wave US1 of the transmitted ultrasonic wave US0, which is diffused to be propagated from the first measured portion 15ma of the first side wall portion 15 toward its periphery (upward and downward directions in FIG. 4), is absorbed by the absorption member 130 placed in the peripheral portion 15mb around the first measured portion 15ma and restrained from further propagation. Similarly, the going-around ultrasonic wave US2 which is to be propagated from the periphery of the second measured portion 16ma of the second side wall portion 16 to the second measured portion 16ma (the downward and upward direction in FIG. 4), is absorbed by the absorption member 135 in the peripheral portion 16mb around the second measured portion 16ma and restrained from reaching the second measured portion 16ma. Accordingly, it is possible to effectively restrain the diffused ultrasonic wave US1, which is sent from the transmitting probe 120 to the first side wall portion 15, from going around to propagate in the battery case 10 and being received by the receiving probe 125 as the going-around ultrasonic wave US2.

Subsequently, the controller 150 determines the impregnated state of the electrolytic solution 50 into the electrode body 20 in the battery 1 based on the receipt signal RS which is obtained by the receiving probe 125.

Figure 6A:
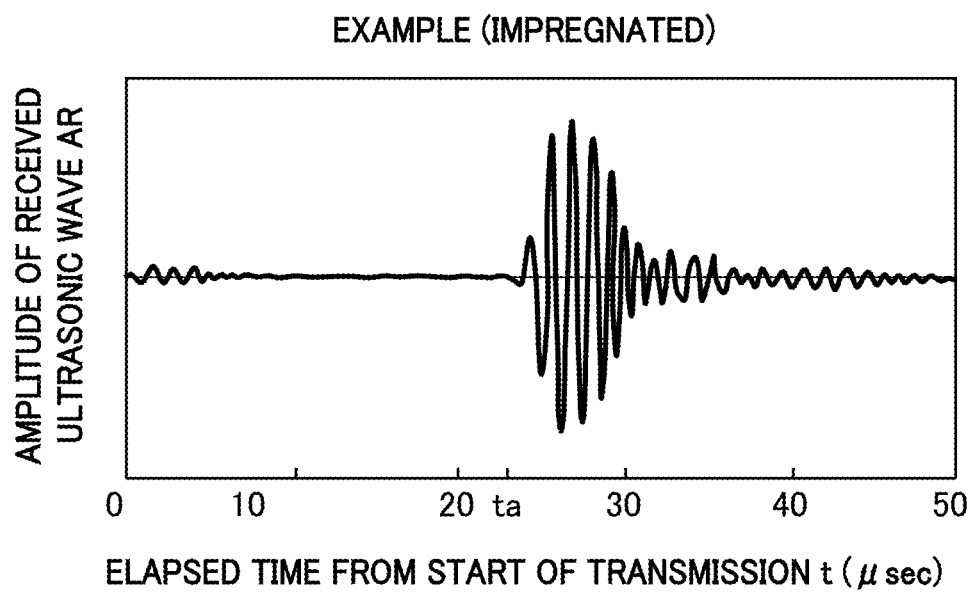
FIG. 6A is a graph indicating a relation between an elapsed time from start of sending the transmitted ultrasonic wave and the amplitude of received ultrasonic wave received by a receiving probe in the embodiment, specifically indicating a case of a rectangular battery in which electrolytic solution is impregnated enough into an electrode body.

Herein, when the battery 1 to be examined is a battery 1 in which the electrolytic solution 50 is well impregnated in the electrode body 20, as shown in FIG. 6A, after a certain elapsed time ta (in the present embodiment 1, ta=about 23 μsec) has passed since the transmitted ultrasonic wave US0 (see FIG. 4) of the burst waveform has started (the elapsed time t=0) to be sent out from the transmitting probe 120, the received ultrasonic wave US5, which is of a burst waveform having a frequency as similar to that of the transmitted ultrasonic wave US0 (see FIG. 5) with a large amplitude AR, is received by the receiving probe 125 for about a term of 10 μsec and the receipt signal RS corresponding to this ultrasonic wave US5 is obtained.

In the battery 1 in which the electrolytic solution 50 is impregnated enough in the electrode body 20, the electrolytic solution 50 is filled in between the positive electrode plate 21 or the negative electrode plate 22 and the separator 23 which constitute the electrode body 20 and inside the separator 23, and thus it is presumed that pre-penetrated ultrasonic wave UST passes through the electrode body 20 with less attenuation and is penetrated through the second measured portion 16ma as post-penetrated ultrasonic wave USR and further conveyed to the receiving probe 125 as the received ultrasonic wave US5. As a result of this, the battery 1 which has thus obtained the receipt signal RS is determined to be a non-defective product with preferable impregnated state of the electrolytic solution 50 into the electrode body 20.

Figure 6B:
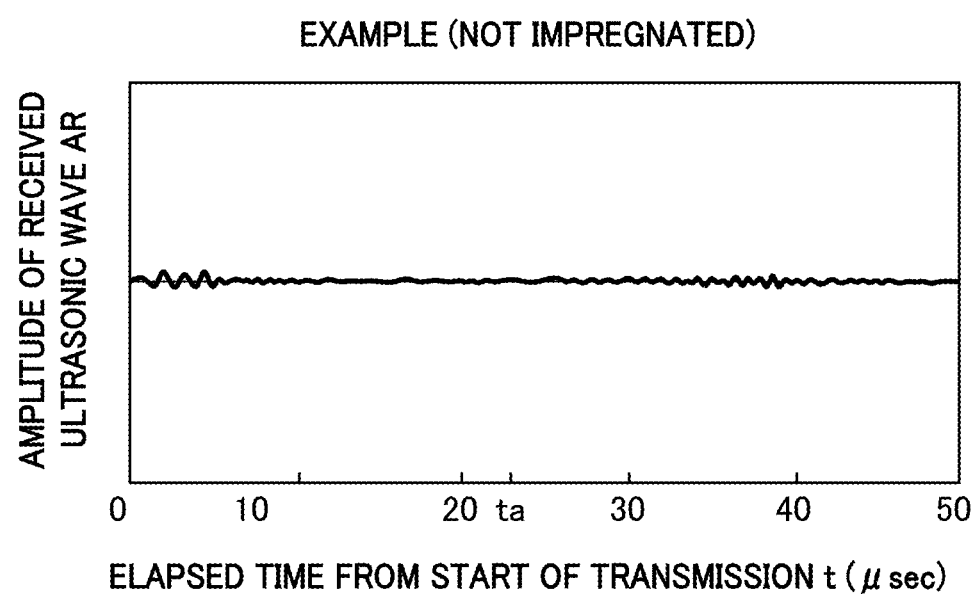
FIG. 6B is a graph indicating a relation between the elapsed time from start of sending the transmitted ultrasonic wave and the amplitude of the received ultrasonic wave received by the receiving probe in the embodiment, specifically indicating a case of the rectangular battery in which the electrolytic solution is not impregnated at all into the electrode body in the example.

On the other hand, to the semblance of the battery 1 in which the electrolytic solution 50 is not impregnated at all in the electrode body 20, FIG. 6B shows a result of the impregnation examination carried out for the battery 1 in which no electrolytic solution 50 is injected. In this case, even if the transmitted ultrasonic wave US0 of the burst waveform is transmitted from the transmitting probe 120, the received ultrasonic wave US5 received by the receiving probe 125 rarely includes a signal of a burst waveform. In the battery 1 in which the electrolytic solution 50 is rarely impregnated in the electrode body 20, a space between the positive electrode plate 21 or the negative electrode plate 22 and the separator 23 those of which constitute the electrode body 20 and inside the separator 23 are filled with air, causing large attenuation of the pre-penetrated ultrasonic wave UST while the pre-penetrated ultrasonic wave UST is to be penetrated through the electrode body 20. This makes it difficult for the pre-penetrated ultrasonic wave UST to pass through the electrode body 20 and to be conveyed to the second measured portion 16ma as the post-penetrated ultrasonic wave USR. Accordingly, it is presumed that the received ultrasonic wave US5 could not be detected the signal of the burst waveform at a time around the elapsed time ta. The battery 1 which has obtained the receipt signal RS as mentioned above is determined to be a defect product in which the impregnated state of the electrolytic solution 50 into the electrode body 20 is unpreferable.

Further, when the electrolytic solution 50 is not impregnated enough into the electrode body 20 (data is not shown), a shape of the burst waveform appearing in the received ultrasonic wave US5 which is received by the receiving probe 125 is delayed from the above-mentioned elapsed time ta, and a degree of the amplitude AR of the received ultrasonic wave US5 becomes smaller than that in a case of the electrolytic solution 50 being impregnated well enough into the electrode body 20 (see FIG. 6A). In the battery 1 in which impregnation of the electrolytic solution 50 into the electrode body 20 is not enough, the electrolytic solution 50 exists in the space between the positive electrode plate 21 or the negative electrode plate 22 and the separator 23 which constitute the electrode body 20 and in a part of the inside of the separator 23, while other parts are filled with air. Accordingly, it is presumed that when the pre-penetrated ultrasonic wave UST is conveyed to the electrode body 20, a path of conveying the ultrasonic wave could be long and attenuation of the ultrasonic wave could occur. The battery 1 obtained with such a receipt signal RS is also determined as a defective product in which the impregnated state of the electrolytic solution 50 is unpreferable.

Thereafter, the batteries 1 performed with the impregnation examination are taken out of the impregnation examination device 100, and the batteries 1 examined to be non-defective are left while the batteries 1 determined to be defective are excluded.

Subsequently, in an "initial charging step" S3 (see FIG. 2), the (non-defective) battery 1 is connected with a charging device (not shown) and performed with initial charging to SOC 100% by charging at Constant Current Constant Voltage (CCCV) under an environmental temperature of 25° C.

Subsequently, in an "aging step" S4, the initially charged battery 1 is left as it is for ten hours under the environmental temperature of 60° C. in a state in which terminals are kept open for applying high-temperature aging to the battery 1. Thereafter, this battery 1 is performed with various tests. In this manner, production of the battery 1 is completed.

Comparative Embodiment 1

Figure 7:
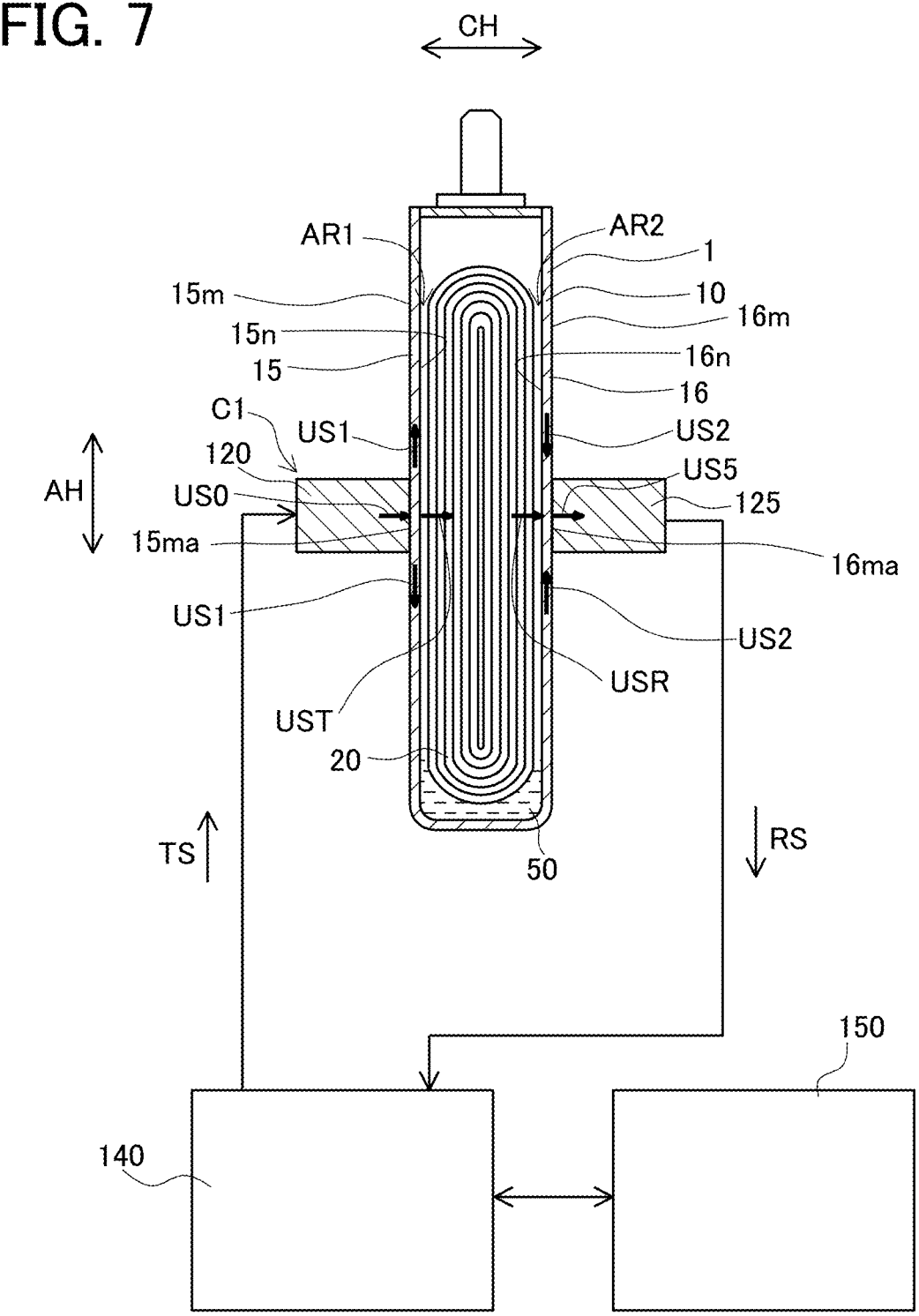
FIG. 7 is a sectional view corresponding to FIG. 4 of the impregnation examination device and the rectangular battery disposed in the device in a comparative embodiment 1.
Figure 8A:
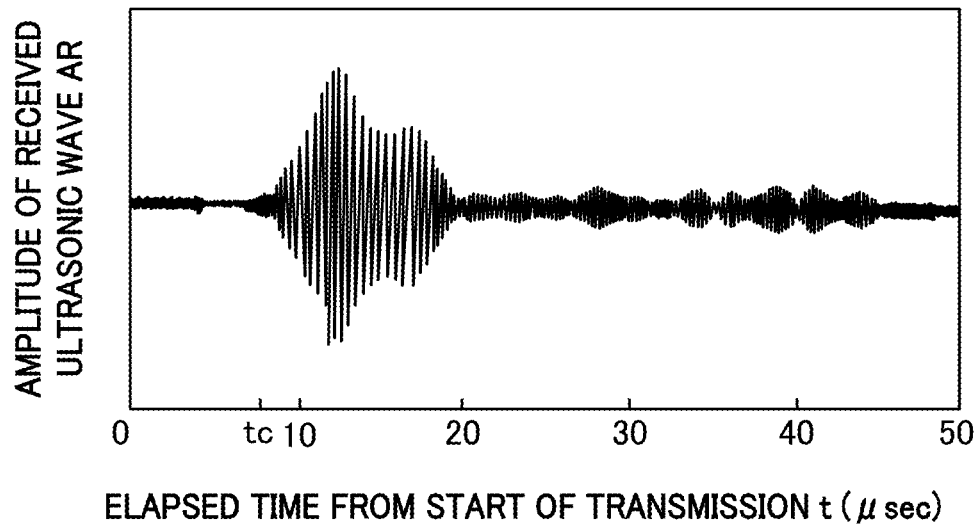
FIG. 8A is a graph indicating a relation between the elapsed time from start of sending the transmitted ultrasonic wave and the amplitude of the received ultrasonic wave received by the receiving probe in the comparative embodiment 1, specifically indicating a case of the rectangular battery in which the electrolytic solution is impregnated well enough into the electrode body.
Figure 8B:
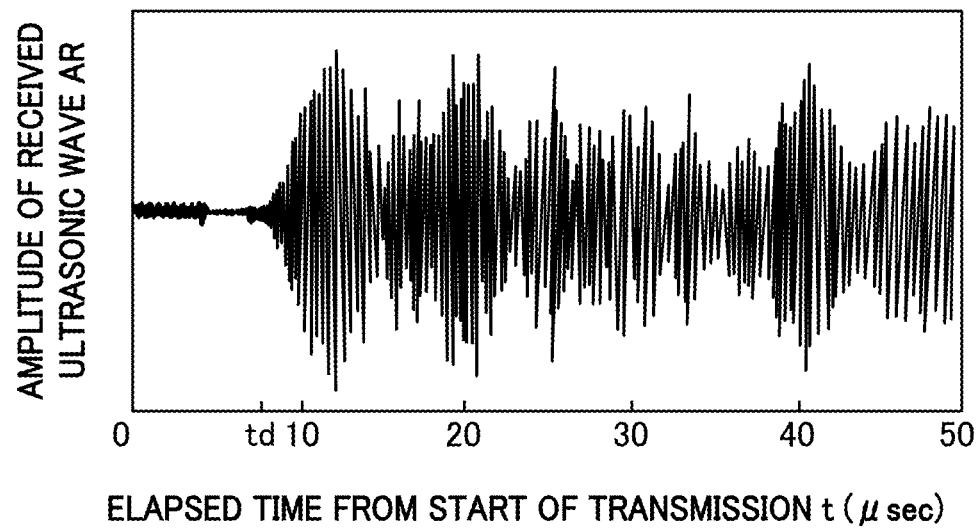
FIG. 8B is a graph indicating a relation between the elapsed time from start of sending the transmitted ultrasonic wave and the amplitude of the received ultrasonic wave received by the receiving probe in the comparative embodiment 1, specifically indicating a case of the rectangular battery in which the electrolytic solution is not impregnated at all into the electrode body.

Next, a comparative embodiment 1 of the above-mentioned embodiment 1 is explained (see FIG. 7, FIG. 8A, and FIG. 8B). The comparative embodiment 1 is also performed with the steps S1 to S4 as similar to the embodiment 1 for producing the battery 1. In the impregnation examining step S2 of those steps, the transmitting probe 120 and the receiving probe 125 are used as similar to the embodiment 1, but unlike the above-mentioned impregnation examination device 100, an impregnation examination device C1 not performing binding of the battery 1 by the binding plates 110 and 115 and absorption of the ultrasonic wave by the absorption members 130 and 135 but only performing retention of the transmitting probe 120 and the receiving probe 125 relative to the battery 1 is adapted, which is different from the embodiment 1. To be specific, the impregnation examination device C1 does not utilize the binding plates 110 and 115 and the absorption members 130 and 135, but instead uses a not-shown holding part to bring the transmitting probe 120 into close contact with the first measured portion 15$ma$ of the first side wall portion 15 of the battery case 10 and bring the receiving probe 125 into close contact with the second measured portion 16$ma$ of the second side wall portion 16 of the battery case 10 for holding. Then, as similar to the embodiment 1, the transmitted ultrasonic wave US0 is sent from the transmitting probe 120 (see FIG. 5), and the received ultrasonic wave US5 is received by the receiving probe 125.

In the above-mentioned embodiment 1, when the non-defective battery 1 in which the electrolytic solution 50 is impregnated well enough into the electrode body 20 is examined, there is generated a signal of a burst waveform at a similar frequency (0.8 MHz) to the transmitted ultrasonic wave US0 on the receipt signal RS after the elapsed time ta (in the embodiment 1, ta=23 pec) has passed since the transmitted ultrasonic wave US0 of the burst waveform has been started to be sent from the transmitting probe 120 (elapsed time t=0) (see FIG. 6A).

On the other hand, in the present comparative embodiment 1, when the non-defective battery 1 in which the electrolytic solution 50 is impregnated well enough into the electrode body 20 is examined, the received ultrasonic wave US5 (the receipt signal RS) shown in FIG. 8A, which is different from the case of the embodiment 1 (see FIG. 6A), is obtained. Namely, in the present comparative embodiment 1, in examining the non-defective battery 1, the received ultrasonic wave US5 having a burst waveform with large amplitude is received for a term of about 12 µsec (see FIG. 8A) after elapse of a certain elapsed time tc (in the present comparative embodiment 1, tc=about 8 pec) which is shorter than the elapsed time ta of the embodiment 1 since the transmitting probe 120 has started sending the transmitted ultrasonic wave US0 of the burst waveform (t=0).

On the other hand, to the semblance of the battery 1 in which the electrolytic solution 50 is not impregnated at all in the electrode body 20, the receipt signal RS shown in FIG. 8B different from the case of the embodiment 1 (see FIG. 6B) is obtained when the impregnation examining step S2 is carried out for the battery 1 with no injection of the electrolytic solution 50. When the battery 1 with no injection is examined, as explained in the embodiment 1, even if the transmitted ultrasonic wave US0 is sent from the transmitting probe 120, the receiving probe 125 should be rarely able to receive the ultrasonic wave as the received ultrasonic wave US5 in the first place (see FIG. 6B). However, in the present comparative embodiment 1, on and after the elapsed time td=about 8 µsec, a large ultrasonic wave is received as the received ultrasonic wave US5 for a long term more than the elapsed time t=50 µsec (see FIG. 8B).

As it would be easily understood by comparing with a case of the embodiment 1 (see FIG. 6A), in any cases (see FIG. 8A and FIG. 8B), the received ultrasonic wave US5 of a burst waveform or a long-term wave that has been received on or after the elapsed time tc or td (tc, td=about 8 µsec) has a frequency higher (about as three times as high) than the frequency (0.8 MHz) of the transmitted ultrasonic wave US0. Therefore, in this comparative embodiment, the received ultrasonic wave US5 of the burst waveform or the long-term wave, which has been received on or after the predetermined elapsed time tc, td has elapsed, is not conceived to be an ultrasonic wave received by the receiving probe 125 as the received ultrasonic wave US5, which is a part of the transmitted ultrasonic wave US0 sent from the transmitting probe 120 that advances straight in the thickness direction CH of the battery 1 to be conveyed to the first measured portion 15$ma$ of the first side wall portion 15 as the pre-penetrated ultrasonic wave UST and further penetrates through the electrode body 20 and then reaches the second measured portion 16$ma$ of the second side wall portion 16 as the post-penetrated ultrasonic wave USR.

In the comparative embodiment 1, a reason is not sure for obtention of the received ultrasonic wave US5 of the burst waveform or the long-term wave with the higher frequency than the frequency of the transmitted ultrasonic wave US0 in a term of the elapsed time t=8 to 20 µsec in a case of the non-defective battery 1 or on or after the elapsed time t=8 µsec in a case of the battery 1 with no injection.

It is however conceivable that in the comparative embodiment 1, the impregnation examination device C1 does not utilize the binding plates 110 and 115 and thus the device C1 does not bind the battery 1. Namely, the battery case 10 is not pressed by the binding plates 110 and 115, and thus it is conceived that there are air layers AR1 and AR2 (see FIG. 7) between the first side wall portion 15 and the electrode body 20 and between the second side wall portion 16 and the electrode body 20, respectively.

Accordingly, a part of the transmitted ultrasonic wave US0 sent from the transmitting probe 120 is hard to be transmitted as the pre-penetrated ultrasonic wave UST to the electrode body 20 from the first measured portion 15$ma$ of the first side wall portion 15. Further it is also considered that the post-penetrated ultrasonic wave USR that has passed through the electrode body 20 is difficult to be conveyed to the second measured portion 16*ma* of the second side wall portion 16.

Further in the present comparative embodiment 1, the absorption members 130 and 135 for absorbing the ultrasonic wave are not in close contact with the battery case 10. Therefore, a large part of the transmitted ultrasonic wave US0 sent from the transmitting probe 120 is transmitted not as the pre-penetrated ultrasonic wave UST but as the diffused ultrasonic wave US1 to expand from the first measured portion 15*ma* of the first side wall portion 15 to its surroundings (upward and downward directions in FIG. 7). Then, it is conceived that the ultrasonic wave takes a roundabout path to propagate in the battery case 1 to become the going-around ultrasonic wave US2 propagating toward the second measured portion 16*ma* (the downward and upward directions in FIG. 7) from the surroundings of the second measured portion 16*ma* of the second side wall portion 16 and then is received by the receiving probe 125 as the received ultrasonic wave US5. The diffused ultrasonic wave US1 and the going-around ultrasonic wave US2 propagate in the battery case 10 made of metal (in the present comparative embodiment 1, aluminum) in a propagation direction. Accordingly, it is conceived that the received ultrasonic wave US5 of the burst waveform has reached on and after the elapsed time tc and td (=about 8 μsec) which is faster than the elapsed time to (=23 μsec) in the embodiment 1 since propagation speed (sonic speed) of the ultrasonic wave in the battery case (made of aluminum) is fast even though a propagation distance is longer than in the case of passing through the electrode body 20.

Further, in a case that the battery 1 with no injection of the electrolytic solution 50 is examined (see FIG. 8B), the long-term continuing received ultrasonic wave US5 is received on and after the elapsed time td. On the other hand, when the non-defective battery 1 in which the electrolytic solution 50 is impregnated enough in the electrode body 20 is examined (see FIG. 8A), the received ultrasonic wave US5 of the burst waveform is received for about 12 pec on and after the elapsed time tc has passed. In the battery 1 in which the electrolytic solution 50 is injected, while the going-around ultrasonic wave US2 takes a roundabout path in the battery case 10 for propagation, there is generated mutual propagation of the ultrasonic wave between the battery case 10 and the electrolytic solution 50 contacted to the battery case 10. However, energy loss easily occurs during this mutual propagation, and thus it is conceived that the going-around ultrasonic wave US2 has attenuated early. On the contrary, the battery 1 with no injection is hardly generated with attenuation of the going-around ultrasonic wave US2 that propagates in the battery case 10, and accordingly it is conceived that the large ultrasonic wave as the received ultrasonic wave US5 is received for a long term (see FIG. 8B).

Further, in this comparative embodiment 1, as the received ultrasonic wave US5 of the burst waveform or the long-term wave, the received ultrasonic wave US5 having the frequency higher (about as three times as high) than the frequency (0.8 MHz) of the transmitted ultrasonic wave US0 has been received. Reason for this is also unsure, but it is conceived that when the transmitted ultrasonic wave US0 being sent from the transmitting probe 120 and advancing in the thickness direction CH changes its direction to expand and propagate toward the surroundings of the first measured portion 15*ma* from the first measured portion 15*ma* of the first side wall portion 15 (the upward and downward directions in FIG. 7) as the diffused ultrasonic wave US1, the transmitted ultrasonic wave US0 turns to the diffused ultrasonic wave US1 with harmonic (triple harmonic) wave by non-linear effect and propagates, and then turns to the going-around ultrasonic wave US2 and then to the received ultrasonic wave US5 to be observed by the receiving probe 125.

Comparative Embodiment 2

Figure 9:
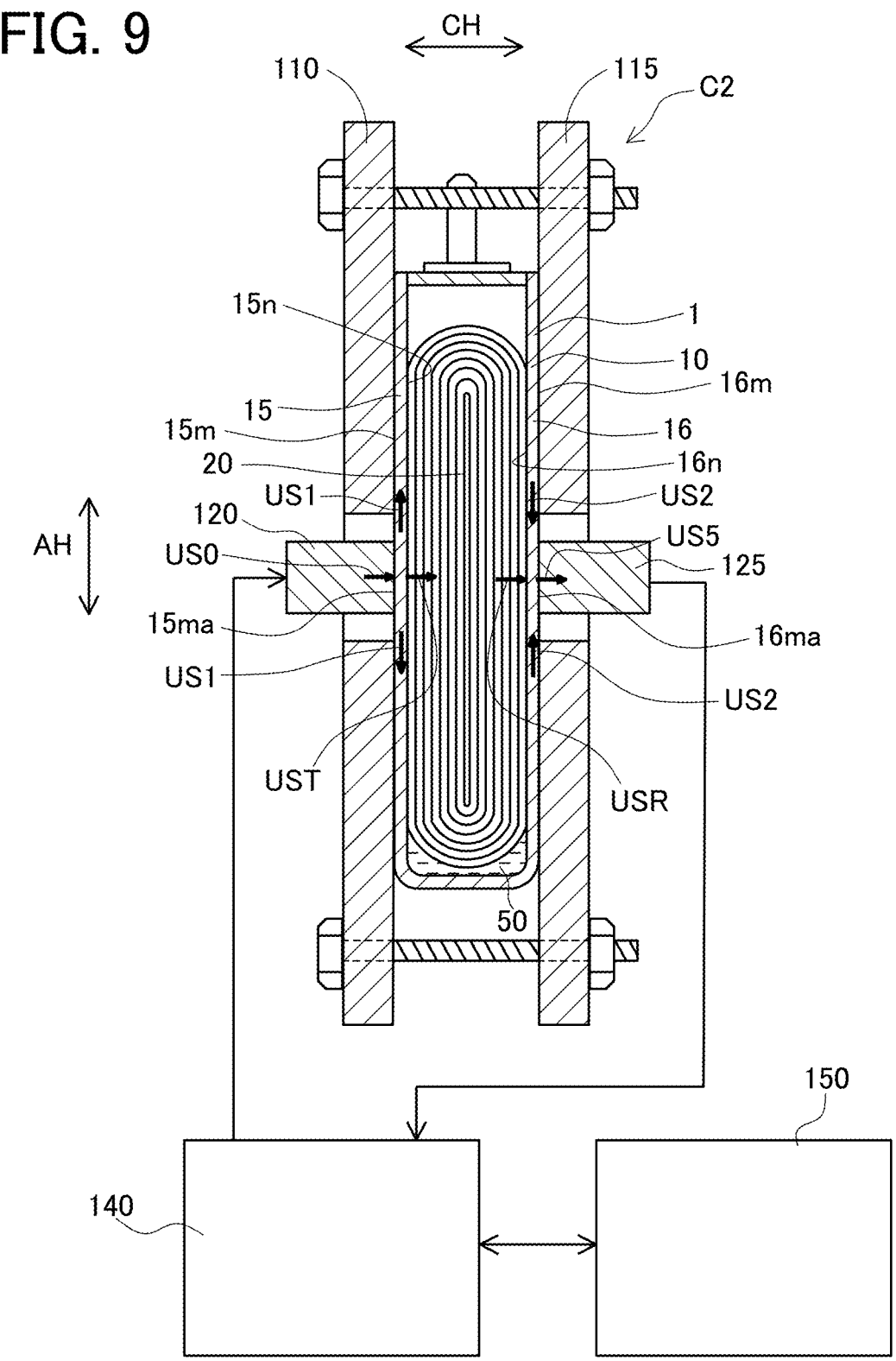
FIG. 9 is a sectional view corresponding to FIG. 4 of the impregnation examination device and the rectangular battery disposed in the device in the comparative embodiment 2.
Figure 10A:
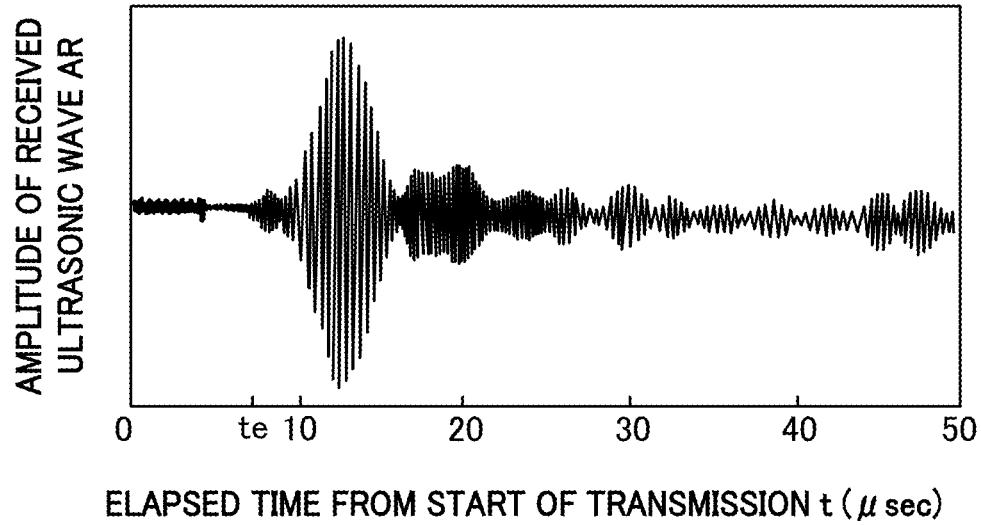
FIG. 10A is a graph indicating a relation between the elapsed time from start of sending the transmitted ultrasonic wave and the amplitude of the received ultrasonic wave received by the receiving probe in the comparative embodiment 2, specifically indicating a case of the rectangular battery in which the electrolytic solution is impregnated well enough in the electrode body.
Figure 10B:
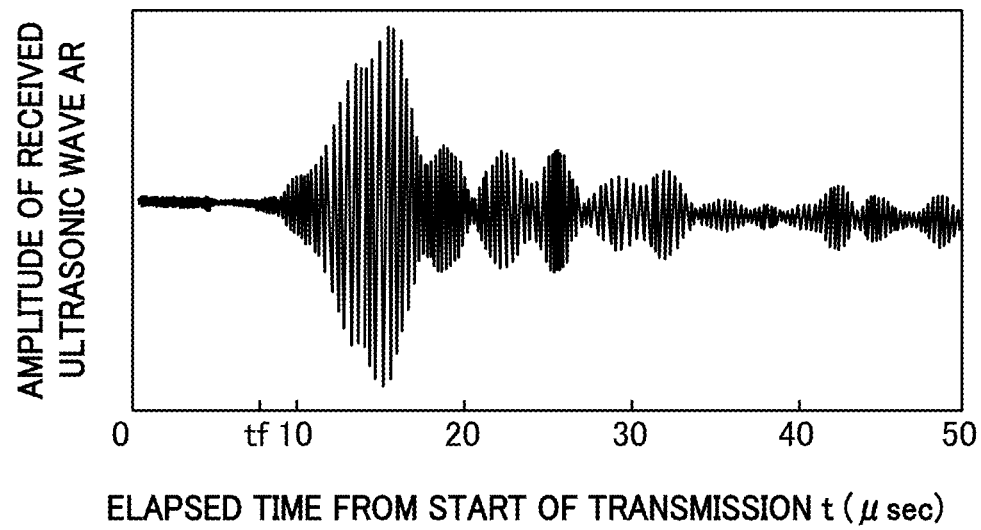
FIG. 10B is a graph indicating a relation between the elapsed time from start of sending the transmitted ultrasonic wave and the amplitude of the received ultrasonic wave received by the receiving probe in the comparative embodiment 2, specifically indicating a case of the rectangular battery in which the electrolytic solution is not impregnated at all in the electrode body.

Next, a second comparative embodiment is explained (see FIG. 9, FIG. 10A, and FIG. 10B). Also in the present comparative embodiment 2, each step of S1 to S4 as similar to the embodiment 1 is performed for producing the battery 1. In the impregnation examining step S2 of those steps, the transmitting probe 120 and the receiving probe 125 are used as similar to the embodiment 1, but unlike the above-mentioned impregnation examination device 100, an impregnation examination device C2 of binding the battery 1 by the binding plates 110 and 115 and retaining the transmitting probe 120 and the receiving probe 125 without using the absorption members 130 and 135, which is different from the embodiment 1. To be specific, the battery 1 is directly pressed and bound by the binding plates 110 and 115 without using the absorption members 130 and 135 so that the transmitting probe 120 is brought into close contact with the first measured portion 15*ma* of the first side wall portion 15 and the receiving probe 125 is brought into close contact with the second measured portion 16*ma* of the second side wall portion 16. Then, as similar to the embodiment 1, the transmitted ultrasonic wave US0 is transmitted from the transmitting probe 120 (see FIG. 5) and the received ultrasonic wave US5 is received by the receiving probe 125.

In the present comparative embodiment 2, when the non-defective battery 1 in which the electrolytic solution 50 is impregnated enough in the electrode body 20 is examined, the received ultrasonic wave US5 (the receipt signal RS) shown in FIG. 10A which is different from the cases of the embodiment 1 (see FIG. 6A) and the comparative embodiment 1 (see FIG. 8A). Namely, in the present comparative embodiment 2, as a result of examining the non-defective battery 1, the received ultrasonic wave US5 of the burst waveform with large amplitude is received (see FIG. 10A) for a period of time of about 8 μsec of an elapsed time t=8 to 16 μsec on and after elapse of a certain elapsed time te (in the present comparative embodiment 2, te=about 8 μsec) which is shorter than the elapsed time to of the embodiment 1 but almost same as the elapsed time tc of the comparative embodiment 1 since the transmitted ultrasonic wave US0 of the burst waveform has started to be sent (t=0) from the transmitting probe 120.

On the other hand, when the battery 1 with no injection of the electrolytic solution 50 to the semblance of a case of examining the battery 1 in which the electrolytic solution 50 is not impregnated at all in the electrode body 20, the receipt signal RS shown in FIG. 10B which is different from those of the embodiment 1 (see FIG. 6B) and the comparative embodiment 1 (see FIG. 8B) is obtained. When the battery 1 with no injection is examined, even when the transmitted ultrasonic wave US0 is sent from the transmitting probe 120, the ultrasonic wave should have been rarely received as the received ultrasonic wave US5 by the receiving probe 125 (see FIG. 6B) as explained in the embodiment 1, in the first place. However, in the present comparative embodiment 2, the received ultrasonic wave US5 of the burst waveform with a large amplitude is received for a term of about 10 μsec of the elapsed time t=8 to 18 μsec on and after elapse of a certain time tf (in the present comparative embodiment 2, tf=about 8 μsec) which is almost similar to the elapsed time tc in the comparative embodiment 1 (see FIG. 10B).

However, as easily understood by comparing with the embodiment 1 (see FIG. 6A), the received ultrasonic wave US5 of the burst waveform which is received on and after the elapsed time te or tf (te, tf=about 8 μsec) has the frequency higher (as about three times as high) than the frequency (0.8 MHz) of the transmitted ultrasonic wave US0 in any cases (see FIG. 10A and FIG. 10B). Accordingly, in this comparative embodiment 2, the received ultrasonic wave US5 of the burst waveform received on and after the elapsed time te and tf is not perceived as the ultrasonic wave similar to the one obtained in the embodiment 1, that is a part of the transmitted ultrasonic wave US0 sent from the transmitting probe 120 advancing straight in the thickness direction CH of the battery 1 and being transmitted to the first measured portion 15ma of the first side wall portion 15 as the pre-penetrated ultrasonic wave UST and further penetrated through the electrode body 20, reaching the second measured portion 16ma of the second side wall portion 16 as the post-penetrated ultrasonic wave USR, and then being received by the receiving probe 125 as the received ultrasonic wave US5.

There is no clear detailed reason for obtention of the received ultrasonic wave US5 of the burst waveform with high frequency higher than the frequency of the transmitted ultrasonic wave US0 for the elapsed time t=8 to 16 μsec in the non-defective battery 1 in which the electrolytic solution 50 is impregnated enough in the electrode body 20 and for the elapsed time t=8 to 18 μsec in the battery 1 with no injection in the comparative embodiment 2.

However, it is estimated that in the present comparative embodiment 2, the impregnation examination device C2 utilizes the binding plates 110 and 115 to bind the battery 1, but the absorption members 130 and 135 for absorbing the ultrasonic wave are not provided to be in close contact with the battery case 10. Therefore, a part of the transmitted ultrasonic wave US0 sent from the transmitting probe 120 is transmitted from the first measured portion 15ma of the first side wall portion 15 to the electrode body 20 as the pre-penetrated ultrasonic wave UST, and then the post-penetrated ultrasonic wave USR having passed through the electrode body 20 is conveyed to the second measured portion 16ma of the second side wall portion 16.

However, a part of the transmitted ultrasonic wave US0 transmitted from the transmitting probe 120 has become the diffused ultrasonic wave US1 with harmonic (triple harmonic) wave faster than the above-mentioned post-penetrated ultrasonic wave USR and propagates to expand toward the surroundings (the upward and downward directions in FIG. 7) of the first measured portion 15ma from the first measured portion 15ma. Then, it is perceived that the diffused ultrasonic wave US1 takes a roundabout path to propagate in the battery case 10 to become the going-around ultrasonic wave US2 that is propagated from the surroundings of the second measured portion 16ma of the second side wall portion 16 to the second measured portion 16ma (the downward and upward directions in FIG. 7), and thus the ultrasonic wave is received in the second measured portion 16ma by the receiving probe 125 as the received ultrasonic wave US5.

Further, in the present comparative embodiment 2, the absorption members 130 and 135 for absorbing the ultrasonic wave are not in close contact with the battery case 10, but both in the case of examining the non-defective battery 1 (see FIG. 10A) and in the case of examining the battery 1 with no injection (see FIG. 10B), the received ultrasonic wave US5 of the burst waveform continuing for about 8 μsec or for about 10 μsec is obtained. In the present comparative embodiment 2, the impregnation examination device C2 utilizes the binding plates 110 and 115 to bind the battery 1 such that the inside surface 15n of the first side wall portion 15 and the inside surface 16n of the second side wall portion 16 of the battery case 10 are brought into contact with the electrode body 20, respectively. Accordingly, it is assumed that while the diffused ultrasonic wave US1 or the going-around ultrasonic wave US2 propagates in the battery case 10, there is generated mutual propagation of the ultrasonic wave between the battery case 10 and the electrode body 20 contacted thereto or further between the battery case 10 and the electrolytic solution 50 but energy loss easily occurs at this time of mutual propagation, so that the going-around ultrasonic wave US2 has attenuated early.

As explained above, in the producing method of the battery 1, the first side wall portion 15 and the second side wall portion 16 of the battery case 1 are held and pressed in the impregnation examining step S2 to bring the inside surface 15n of the first side wall portion 15 and the inside surface 16n of the second side wall portion 16 into contact with the electrode body 20 and that the transmitting probe 120 and the receiving probe 125 are brought into close contact with the first measured portion 15ma inside the outside surface 15m of the first side wall portion 15 and the second measured portion 16ma inside the outside surface 16m of the second side wall portion 16, respectively. Accordingly, the transmitted ultrasonic wave US0 sent from the transmitting probe 120 is directly transmitted to the first side wall portion 15, reaches the electrode body 20 without intervened by the air layer, passes through this electrode body 20, and further is transmitted to the second side wall portion 16 from the electrode body 20 without intervened by the air layer, so that the ultrasonic wave is directly conveyed to the receiving probe 125 from the second side wall portion 16. Thus, the post-penetrated ultrasonic wave USR that has been sent from the transmitting probe 120 and has passed through the electrode body 20 and others can be properly received by the receiving probe 125.

On the other hand, in the battery case 10, the absorption member 130 for absorbing the diffused ultrasonic wave US1 is placed in the peripheral portion 15mb of the first measured portion 15ma to which the transmitting probe 120 is in close contact, and the absorption member 135 for absorbing the going-around ultrasonic wave US2 is placed in the peripheral portion 16mb of the second measured portion 16ma to which the receiving probe 125 is in close contact. Arrangement of these absorption members can restrain occurrence of noise which is generated by a part of the transmitted ultrasonic wave US0 sent from the transmitting probe 120 being diffused from the first measured portion 15ma without passing through the electrode body 20, going around and propagating in the battery case 10, and reaching the second measured portion 16ma to be received by the receiving probe 125.

By the above configuration, the impregnated state of the electrolytic solution 50 in the electrode body 20 of the battery 1 can be appropriately examined.

Embodiment 2

Figure 11:
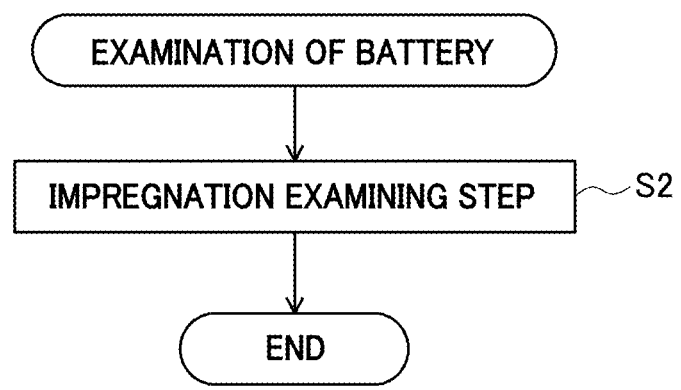
FIG. 11 is a flowchart of an examination process of a rectangular battery in an embodiment 2.

Next, a second embodiment is explained. The embodiment 1 is illustrated with a case of performing the impregnation examining step S2 during the production process of the battery 1. On the other hand, the embodiment 2 is different in a manner that the impregnation examining step S2 is performed for the battery 1 after shipping (see FIG. 11). The impregnation examining step S2 itself is same as the one in the embodiment 1.

In the case of performing the impregnation examination for the battery 1 after shipping, too, the impregnated state of the electrolytic solution 50 in the electrode body 20 can be appropriately examined as explained in the embodiment 1.

As mentioned above, the present disclosure has been explained in the embodiments 1 and 2, but the present disclosure is not limited to the embodiments 1 and 2 and may be applied with any appropriate modifications without departing from the scope of the subject matter.

For example, in the embodiments 1 and 2, the absorption members 130 and 135 for absorbing the ultrasonic wave US are placed in both the peripheral portion 15mb of the first measured portion 15ma and the peripheral portion 16mb of the second measured portion 16ma in the battery case 10, but alternatively, the absorption member may be placed in any one of the peripheral portions. Further, the absorption members 130 and 135 may be made not only of rubber but also of resin, clay, grease, and gel.

REFERENCE SIGNS LIST

1 Rectangular battery (battery)
10 Rectangular battery case (battery case)
15 First side wall portion
15n Inside surface (of the first side wall portion)
15m Outside surface (of the first side wall portion)
15ma First measured portion
15mb Peripheral portion (of the first measured portion)
16 Second side wall portion
16n Inside surface (of the second side wall portion)
16m Outside surface (of the second side wall portion)
16ma Second measured portion
16mb Peripheral portion (of the second measured portion)
20 Electrode body
50 Electrolytic solution
100, C1, C2 Impregnation examination device
110, 115 Binding plate
120 Transmitting probe
125 Receiving probe
130, 135 Absorption member
140 Probe drive device
150 Controller
TS Transmission signal
RS Receipt signal
US0 Transmitted ultrasonic wave
UST Pre-penetrated ultrasonic wave
USR Post-penetrated ultrasonic wave
US1 Diffused ultrasonic wave
US2 Going-around ultrasonic wave
US5 Received ultrasonic wave
t, ta, tc, td, te, tf Elapsed time (elapsed from start of transmission)
AT, AR Amplitude
S1 Assembling step
S2 Impregnation examining step
S3 Initial charging step
S4 Aging step

What is claimed is:

1. A producing method for a rectangular battery in which an electrode body and electrolytic solution are housed in a rectangular battery case, wherein the method includes impregnation examining performed by:
holding and pressing a first side wall portion and a second side wall portion opposing each other with the electrode body sandwiched therebetween in the rectangular battery case of the rectangular battery that has been assembled and bringing an inside surface of the first side wall portion and an inside surface of the second side wall portion to be in respectively contact with the electrode body;
bringing a transmitting probe into close contact with a first measured portion in an outside surface of the first side wall portion and bringing a receiving probe into close contact with a second measured portion in an outside surface of the second wall portion;
in a state in which an absorption member is placed in a peripheral portion of at least any one of the first measured portion and the second measured portion, the absorption member absorbing at least any one of diffused ultrasonic wave to be spread and propagated to a periphery from the first measured portion and going-around ultrasonic wave to be propagated from a periphery of the second measured portion to the second measured portion, receiving post-penetrated ultrasonic wave which has been sent out from the transmitting probe and penetrated through the first side wall portion and the electrode body to reach the second side wall portion, and
determining an impregnated state of the electrolytic solution into the electrode body based on a received signal obtained from the receiving probe.

2. An examining method for a rectangular battery in which an electrode body and electrolytic solution are housed in a rectangular battery case, wherein
the method includes impregnation examining performed by:
holding and pressing a first side wall portion and a second side wall portion opposing each other with the electrode body sandwiched therebetween in the rectangular battery case of the rectangular battery that has been assembled and bringing an inside surface of the first side wall portion and an inside surface of the second side wall portion to be in respectively contact with the electrode body;
bringing a transmitting probe into close contact with a first measured portion in an outside surface of the first side wall portion and bringing a receiving probe into close contact with a second measured portion in an outside surface of the second wall portion;
in a state in which an absorption member is placed in a peripheral portion of at least any one of the first measured portion and the second measured portion, the absorption member absorbing at least any one of diffused ultrasonic wave to be spread and propagated to a periphery from the first measured portion and going-around ultrasonic wave to be propagated from a periphery of the second measured portion to the second measured portion, receiving post-penetrated ultrasonic wave which has been sent out from the transmitting probe and penetrated through the first side wall portion and the electrode body to reach the second side wall portion, and
determining an impregnated state of the electrolytic solution into the electrode body based on a received signal obtained from the receiving probe.

* * * * *